(12) United States Patent
Kobayashi et al.

(10) Patent No.: US 11,451,518 B2
(45) Date of Patent: Sep. 20, 2022

(54) COMMUNICATION DEVICE, SERVER DEVICE, CONCEALED COMMUNICATION SYSTEM, METHODS FOR THE SAME, AND PROGRAM

(71) Applicant: NIPPON TELEGRAPH AND TELEPHONE CORPORATION, Chiyoda-ku (JP)

(72) Inventors: Tetsutaro Kobayashi, Musashino (JP); Yuto Kawahara, Musashino (JP); Hitoshi Fuji, Musashino (JP); Reo Yoshida, Musashino (JP); Kazuki Yoneyama, Hitachi (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 149 days.

(21) Appl. No.: 16/960,129

(22) PCT Filed: Jan. 16, 2019

(86) PCT No.: PCT/JP2019/001097
§ 371 (c)(1),
(2) Date: Jul. 6, 2020

(87) PCT Pub. No.: WO2019/142824
PCT Pub. Date: Jul. 25, 2019

(65) Prior Publication Data
US 2021/0126906 A1    Apr. 29, 2021

(30) Foreign Application Priority Data
Jan. 18, 2018   (JP) .............................. JP2018-006172

(51) Int. Cl.
*H04L 29/06*    (2006.01)
*H04L 9/40*     (2022.01)
*H04L 9/08*     (2006.01)

(52) U.S. Cl.
CPC ........ *H04L 63/0421* (2013.01); *H04L 9/0861* (2013.01); *H04L 63/0428* (2013.01); *H04L 63/062* (2013.01)

(58) Field of Classification Search
USPC ........................................................ 713/150
See application file for complete search history.

(56) References Cited

U.S. PATENT DOCUMENTS

| 5,606,615 A * | 2/1997 | Lapointe ................. G06F 21/34 713/185 |
| 7,010,809 B2 * | 3/2006 | Hori ........................ G06F 21/78 386/E5.067 |

(Continued)

FOREIGN PATENT DOCUMENTS

WO    WO 2017/141399 A1    8/2017

OTHER PUBLICATIONS

International Search Report dated Apr. 16, 2019 in PCT/JP2019/001097 filed on Jan. 16, 2019.

(Continued)

*Primary Examiner* — Amare F Tabor
(74) *Attorney, Agent, or Firm* — Oblon, McClelland, Maier & Neustadt, L.L.P.

(57) ABSTRACT

A communication device includes a signature encryption unit that encrypts input information with a secret key and transmits the information to a server device if the communication device belongs to a group, and a signature decryption unit that downloads, from the server device, encrypted n−1 pieces of the input information transmitted from other communication devices and decrypts the encrypted n−1 pieces of input information with the secret key if the communication device belongs to a group. The communication device transmits session key generation information to the server device via the signature encryption unit, generates a session key using n−1 pieces of session key generation information acquired via the signature decryption unit and session key generation information of the communication device, transmits a cipher text encrypted with the session key via the signature encryption unit to the server (Continued)

device, and decrypts n-1 cipher texts acquired via the signature decryption unit with the session key.

9 Claims, 5 Drawing Sheets

(56) References Cited

U.S. PATENT DOCUMENTS

| | | | | |
|---|---|---|---|---|
| 8,631,475 | B1 * | 1/2014 | O'Malley | H04L 63/12 726/5 |
| 8,966,271 | B2 * | 2/2015 | Vanstone | G06Q 20/3825 713/176 |
| 10,374,799 | B2 * | 8/2019 | Tamrakar | H04L 9/30 |
| 10,615,959 | B2 * | 4/2020 | Sugahara | G06F 21/79 |
| 10,666,523 | B2 * | 5/2020 | Dawes | H04L 67/12 |
| 11,146,637 | B2 * | 10/2021 | Kitchen | H04L 12/2825 |
| 2008/0155267 | A1 * | 6/2008 | Lieber | H04L 9/321 713/183 |

OTHER PUBLICATIONS

Japanese Office Action dated Jun. 23, 2020 in Japanese Patent Application No. 2018-006172 filed on Jan. 18, 2018 (with English language translation), citing above document AO there in.
Tyagi et al., "Stadium: A Distributed Metadata-Private Messaging System," SOSP '17, Oct. 2017 (total 26 pages).

* cited by examiner

COMMUNICATION DEVICE, SERVER DEVICE, CONCEALED COMMUNICATION SYSTEM, METHODS FOR THE SAME, AND PROGRAM

TECHNICAL FIELD

The present invention relates to a communication protocol that can conceal metadata (such as the source and destination of communication) in the area of information communication. More particularly, it relates to a server device as a component of a concealed communication network, communication devices that utilize the concealed communication network, a concealed communication system formed of the server device and communication devices, methods for the same, and a program.

BACKGROUND ART

It is a widely known fact that intelligence agencies or the like of some nations monitor communications such as electronic mail, chat, and voice calls. As a countermeasure against it, anonymization tools such as The Onion Router (Tor) that secure the anonymity of communication by concealing metadata from communication networks have become prevalent.

One of conventional techniques is an approach (mix-net) which ensures anonymity against a concealed communication network by encrypting messages multiple times using different public keys at communication devices and shuffling the messages while repeating decryption among multiple server devices inside the concealed communication network (Non-patent Literature 1).

PRIOR ART LITERATURE

Non-Patent Literature

Non-patent Literature 1: Nirvan Tyagi, Yossi Gilad, Derek Leung, Matei Zaharia, and Nickolai Zel-dovich. "Stadium: A Distributed Metadata-Private Messaging System", [online], SOSP 2017, [searched on Dec. 22, 2017], the Internet <URL: https://eprint.iacr.org/2016/943>

SUMMARY OF THE INVENTION

Problems to be Solved by the Invention

However, the mix-net-based approach has low throughput and is likely to cause delay because decrypting operations are repeated in the concealed communication network and the decrypting operations are proportional to the volume of concealed communication. It also has a disadvantage that the sender and recipient of communication are identifiable by monitoring entries to and exits from the concealed communication network.

An object of the present invention is to provide a concealed communication system, a server device, a communication device, and a concealed communication method in which decrypting operations in a concealed communication network are not proportional to the volume of concealed communication and which makes the sender and recipient of communication unidentifiable.

Means to Solve the Problems

In order to solve the above-described problem, a communication device according to an aspect of the present invention performs communication with other communication devices while keeping anonymity via a concealed communication network including a server device. The communication device includes: a secret key generation unit that generates a secret key using in partial secret keys included in K partial secret keys generated by K key generation devices, respectively; a signature encryption unit in which given that N communication devices including the communication device itself utilize concealed communication provided by the concealed communication network and that n communication devices out of the N communication devices belong to a group, (1-1) if the communication device itself belongs to the group, the signature encryption unit encrypts input information with the secret key and transmits the information to the server device, and (1-2) if the communication device itself does not belong to the group, the signature encryption unit transmits a dummy message to the server device; a signature decryption unit in which (2-1) if the communication device itself belongs to the group, the signature decryption unit downloads, from the server device, encrypted n−1 pieces of the input information and N−n number of the dummy messages transmitted from the other communication devices and decrypts the encrypted n−1 pieces of the input information with the secret key, and (2-2) if the communication device itself does not belong to the group, the signature decryption unit downloads encrypted n pieces of the input information and N−n−1 number of the dummy messages transmitted from the other communication devices; a session key generation unit that transmits session key generation information to the server device via the signature encryption unit, the session key generation information being information for use in generation of a session key, and generates the session key using n−1 pieces of session key generation information acquired via the signature decryption unit and session key generation information of the communication device itself; and a message sending and receiving unit that transmits a cipher text encrypted with the session key via the signature encryption unit to the server device and decrypts n−1 cipher texts acquired via the signature decryption unit with the session key.

Effects of the Invention

The present invention produces the effects of decrypting operations in a concealed communication network being not proportional to the volume of concealed communication, delay being less likely to occur, and the sender and recipient of communication being unidentifiable.

DETAILED DESCRIPTION OF THE EMBODIMENTS

Figure 1:
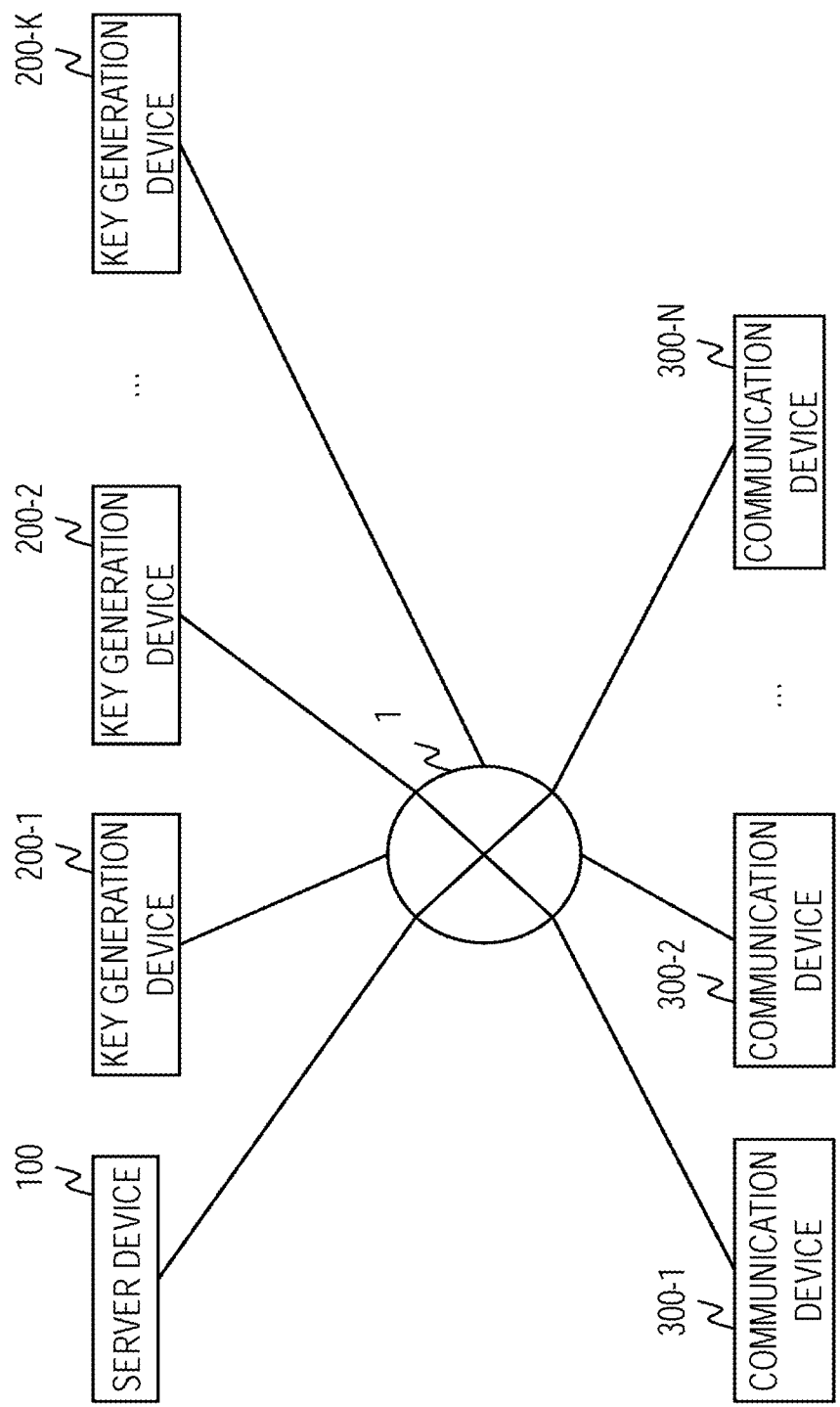
FIG. 1 is a functional block diagram of a concealed communication system according to a first embodiment.

An embodiment of the present invention is described below. In the drawings used in the following description, components with the same function or steps with the same processing are denoted with the same reference characters and redundant description thereof is omitted. In the following description, any processing that is performed per element of a vector or matrix is intended to be applied to all the elements of the vector or matrix unless otherwise specified.

<Settings and Terminology>

π=(BSC.Setup, BSC.Extract, Combine, BSC, BUSC): any-trust doubly-anonymous ID-based broadcast signcryption scheme (AT-DAIBSC scheme). The AT-DAIBSC scheme includes the following five algorithms. BSC.Setup is an algorithm that outputs a master secret key and a master public key when a security parameter κ is input. BSC.Extract is an algorithm that outputs a partial secret key corresponding to a user identifier when the master secret key and a user identifier are input. Note that a partial secret key is assumed to be securely transmitted to a user corresponding to the user identifier. Combine is an algorithm that outputs a secret key when m partial secret keys are input. BSC is an algorithm that takes in master public keys, a message, a secret key, and a set of recipient identifiers as input and outputs a cipher text. BUSC is an algorithm that takes in master public keys, the secret key, and the cipher text as input and outputs a message M or an error.

p: a κ-bit prime number

G: a finite cyclic group of order p with generator g

TCR: $\{0, 1\}^* \rightarrow \{0, 1\}^\kappa$. TCR hash function (TCR means target-collision resistant)

tPRF: $\{0, 1\}^\kappa \times Salt^2_\kappa \times \{0, 1\}^\kappa \rightarrow Z_p$ (PRF means pseudorandom function)

tPRF': $\{0, 1\}^\kappa \times Salt^2_\kappa \times \{0, 1\}^\kappa \rightarrow G$ tPRF and tPRF' are twisted PRFs F: $G \times \{0, 1\}^\kappa \rightarrow K\ space_\kappa$. A pseudo random function with K space$_\kappa$ being a session key space <Settings>

The server device discloses (p, G, g, TCR, tPRF, tPRF', F) as system parameters.

The kth $KGC_k$ generates a master secret key $BMSK_k$ and a master public key $BMPK_k$ using BSC.Setup ($1^\kappa$) and discloses the master public key $BMPK_k$. $KGC_k$ means the kth key generation device, and there are K key generation devices on a communication network. Here, K is any integer greater than 0.

It is assumed that there are N users (may also referred to as N communication devices) $U_1, \ldots, U_N$ in the present concealed communication system.

For each user $U_i$, every $KGC_k$ executes BSC.Extract to generate a partial secret key $bsk^{(k)}_i$ ($bsk^{(k)}_i \leftarrow$ BSC.Extract ($BMSK_k, ID_i$)). Here, i=1, 2, ... N holds.

Upon obtaining in partial secret keys $bsk^{(k)}_i$, the user $U_i$ concatenates these partial secret keys $bsk^{(k)}_i$ using Combine and calculates a secret key $bsk_i$ ($bsk_i \leftarrow$ Combine ($\{bsk^{(k)}_i\}_{k \in [1,m]}$)). Here, in is any integer greater than 0 and K or less. The in partial secret keys $bsk^{(k)}_i$ need not necessarily be the first to the mth partial secret keys $bsk^{(k)}_i$, but may be in out of K partial secret keys $bsk^{(k)}_i$.

The user $U_i$ also generates secret character strings $st_i, st^\sim_i$ ($st_i \in_R \{0, 1\}^\kappa, st^\sim_i \in_R salt_\kappa$), and stores information on them as a static secret key $SSK_i=(bsk_i, st_i, st^\sim_i)$.

<Broadcast>

When a certain user $U_p$ broadcasts the message M to other users in a certain group to which the user $U_p$ belongs (when the user $U_p$ transmits the message M without specifying recipients) in a series of exchanges, the user $U_p$ executes the following processing. Here, the total number of users belonging to the group to which the user $U_p$ belongs is represented as n (n≤N) and the set of those users is represented as R. In this example, assume that R=$(ID_{i\_1}, \ldots, ID_{i\_n})$=$(ID_1, \ldots, ID_n)$ (the first to the nth communication devices belong to the group) for the sake of simplicity. Here, similar processing could be performed on the assumption that any n communication devices out of N communication devices belong to the group. Thus, in this example, p=1, 2, ..., n holds, and the set excluding the user $U_p$ from the set R is defined as $R\backslash\{ID_p\}$=$R'$=$(ID_1, \ldots, ID_{p-1}, ID_{p+1}, \ldots, ID_n)$. Any user other than the user $U_p$ who belongs to the group is represented as $U_q$, where q=1, 2, ..., n and p≠q hold. A user who uses the concealed communication system and who does not belong to the group is represented as $U_r$, where r=n+1, n+2, ..., N holds.

(Signature) The user $U_p$ generates a cipher text $CT_p$ with BSC ($CT_p \leftarrow$ BSC ($\{BMPK_k\}_{k \in [1,m]}, ID_p\|M, bsk_p, R'$)), and transmits the cipher text $CT_p$ to the server device. Here, it is assumed that the user $U_p$ can transmit the cipher text $CT_p$ only once in a series of exchanges (a single broadcast). The user $U_r$ transmits a dummy message ε to the server device.

(Downloading and verification) A user $U_q$ who corresponds to $ID_q$ belonging to R' downloads n−1 cipher texts ($CT_1, \ldots, CT_{q+1}, \ldots, CT_n$) and N−n dummy messages ε from the server device. The user $U_q$ decrypts the cipher text with BUSC (($ID_p$, M)←BUSC ($\{BMPK_k\}_{k \in [1,m]}, bsk_q, CT_p$)). If the result of decrypting the cipher text is ($ID_p$, M), the user $U_q$ regards M as the message transmitted from the user $U_p$.

Broadcast executes the (Signature) process and (Downloading and verification) process described above at intervals of a predetermined time $T_1$. For example, a user randomly executes the (Signature) process described above within a predetermined time T ($<T_1$). When the predetermined time T has elapsed, the user executes the (Downloading and verification) process.

<Session Key Generation>

A group of users $U_1, \ldots, U_n$ start a new session and share a session key. In this protocol, "broadcasting M" means that M is transmitted to the all the users in the group through the following processing.

(Step 1)

Any user $U_p$ corresponding to $ID_p \in R$ generates $x_p \in_R \{0, 1\}^\kappa$, $x^\sim_p \in_R salt_\kappa$, $k_p \in_R \{0, 1\}^\kappa$, and $k^\sim_p \in_R salt$, as $ESK_p$ (an ephemeral secret key for the user $U_p$) and calculates $x'_p$=tPRF ($st^\sim_p, x_p, st_p, x^\sim_p$) and $k'_p$=tPRF'($st^\sim_p, k_p, st_p, k^\sim_p$). Then, the user $U_p$ calculates $X_p=g^{x'\_p}$ and broadcasts $X_p$ as a cipher text $CT_p$. That is, the user $U_p$ obtains $CT_p \leftarrow$ BSC ($\{BMPK_k\}_{k \in [1,m]}, ID_p\|X_p, bsk_p, R'$) and transmits the cipher text $CT_p$ to the server device. Note that $X_p$ is also called first information and $k'_p$ is also called second information.

Any user $U_r$ who corresponds to $ID_r \in (ID_1, \ldots, ID_N)\backslash R$ ($ID_r$ included in the difference set between the set of all the IDs ($ID_1, \ldots, ID_N$) and a subset R of IDs) generates $x_r \in_R \{0, 1\}^\kappa$, $x^\sim_r \in_R salt_\kappa$, $k_r \in_R \{0, 1\}^\kappa$, and $k^\sim_r \in_R salt_\kappa$ as $ESK_r$ and broadcasts ε as a cipher text $CT_r$. Here, ε is a dummy message selected from $G \times \{0, 1\}^{v\_ID}$. The user $U_r$ may also obtain $CT_r \leftarrow$ BSC ($\{BMPK_k\}_{k \in [1,m]}, ID_r\|\epsilon, bsk_r, R'$) and transmit the cipher text $CT_r$ to the server device. However, since the identifier of the user $U_r$ is not included in the set R, no user can decrypt the cipher text $CT_r$, and the cipher text $CT_r$ becomes meaningless information as with the dummy message ε.

(Step 2)

After downloading the message, any user $U_p$ corresponding to $ID_p \in R$ removes ε as a dummy message and decrypts $\{CT_q\}_{ID\_q \in R\backslash\{ID\_p\}}$ to obtain $\{X_q\}_{ID\_q \in R\backslash\{ID\_p\}}$ (($ID_q, X_q$)←BUSC ($\{BMPK_k\}_{k \in [1,m]}, bsk_p, CT_q$)). If the user $U_p$ downloads a dummy message or the cipher text thereof and performs decryption processing on it, the protocol BUSC will output an error message. ε may also be information that can be identified as cipher text. For example, by making the data formats of ε and $CT_j$ different from each other, an error may be determined without executing the protocol BUSC.

Any user $U_p$ (though excluding user $U_1$) calculates sid=$TCR(CT_1, \ldots, CT_n)$ and $T_p = X^{x'_p}_{p-1}$ xor $X^{x'_p}_{p+1}$. Here, A xor B means an exclusive OR between A and B. Then, the user $U_p$ broadcasts $(k'_p, T_p)$. Note that $T_p$ is also called third information.

The user $U_1$ calculates sid=$TCR(CT_1, \ldots, CT_n)$, $T_1 = X^{x'-1}_n$ xor $X^{x'-1}_2$ and $T' = X^{x'-1}_n$ xor $k'_1$. Then, the user $U_1$ broadcasts $(T', T_1)$. Note that T' is also called fourth information.

Any user $U_r$ corresponding to $ID_r \in (ID_1, \ldots, ID_N) \backslash R$ broadcasts ε. Here, ε is a dummy message selected from $G^2 \times \{0, 1\}^{v\_ID}$.

(Session Key Generation and Post-Calculation)

After downloading the message, any user $U_p$ corresponding to $ID_p \in R$ removes ε as a dummy message and receives $(k'_q, T_q)_{ID\_q \in R \backslash \{ID\_p\}}$ and $(T', T_1)$.

Any user $U_p$ (though excluding the user $U_1$) calculates $k'_1 = T'$ xor $X^{x'_p}_{p-1}$ xor $(XOR_{1 \le j \le p-1} T_j)$ and SK=F$(XOR_{1 \le p \le n} k'_p, sid)$. $XOR_{A \le B \le C} D_B$ means $D_A$ xor $D_{A+1}$ xor ... xor $D_C$.

The user $U_1$ calculates SK=F$(XOR_{1 \le p \le n} k'_p, sid)$.

(Transmission and Reception of Message)

When transmitting a message MS, any user $U_p$ corresponding to $ID_p \in R$ encrypts MS with the session key SK using a symmetric key cryptosystem like AES, outputs a cipher text C, and broadcasts C.

After downloading the message, any user $U_p$ corresponding to $ID_p \in R$ removes ε as a dummy message and obtains the message MS.

A system for implementing the above-described concealed communication is now described.

First Embodiment

FIG. 1 shows a topology of a concealed communication system according to a first embodiment.

The concealed communication system includes a server device 100, K key generation devices 200-$k$ (equivalent to the $KGC_k$ above), and N communication devices 300-$i$ (equivalent to the $U_i$ above). Here, k=1, 2, ..., K and i=1, 2, ..., N hold.

The server device 100 is a component of a concealed communication network and is communicatively connected with the N communication devices 300-$i$ via a communication network 1. The K key generation devices 200-$k$ are each communicatively connected with the N communication devices 300-$i$ via the communication network 1. Note that the server device 100 and the K key generation devices 200-$k$ may or may not be communicatively connected with each other. In addition, although this embodiment assumes that one communication device is operated by one user, one communication device may be operated by L users. Here, L is any integer greater than 1. In that case, one communication device may be regarded as L communication devices. When L communication devices are operated by one user, the L communication devices may be regarded as one communication device. The point is that the concealed communication system includes communication devices as many as the number of users of concealed communication services provided by the concealed communication system. However, when one user has more than one account, the one user may be regarded as multiple users.

Each of the server device 100, the K key generation devices 200-$k$, and the N communication devices 300-$i$ is a specially designed device configured by loading of a special program into a well-known or dedicated computer having a central processing unit (CPU), a main storage unit (random access memory: RAM), and the like, for example. The server device 100, the K key generation devices 200-$k$, and the N communication devices 300-$i$ each perform various kinds of processing under control of the central processing unit, for example. Data input to the server device 100, the K key generation devices 200-$k$, and the N communication devices 300-$i$ or data resulting from their processing are stored in the main storage unit, for example, and the data stored in the main storage unit is read to the central processing unit for utilization in other processing as necessary. The processing components of the server device 100, the K key generation devices 200-$k$, and the N communication devices 300-$i$ may at least partially be composed of hardware such as integrated circuitry. Storages included in the server device 100, the K key generation devices 200-$k$, and the N communication devices 300-$i$ may be composed of a main storage unit such as random access memory (RAM), an auxiliary storage unit formed of a hard disk, an optical disk, or a semiconductor memory element such as flash memory, or middleware such as a relational database or a key value store, for example.

Figure 2:
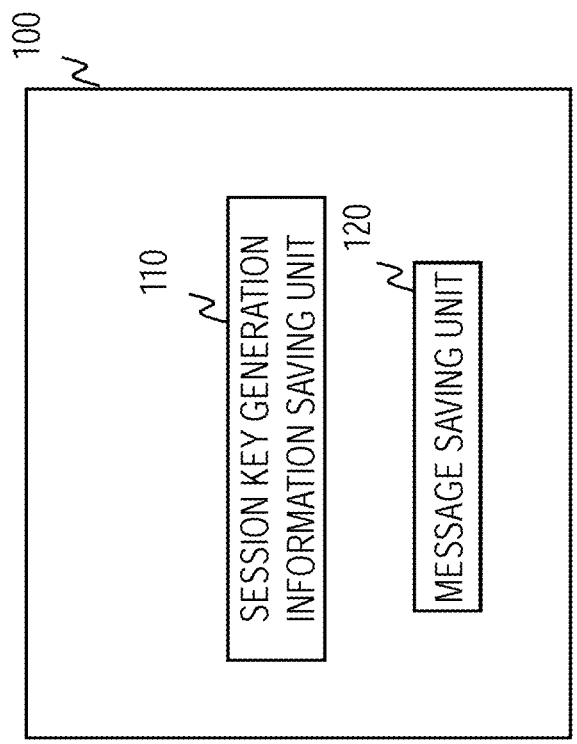
FIG. 2 is a functional block diagram of a server device according to the first embodiment.
Figure 3:
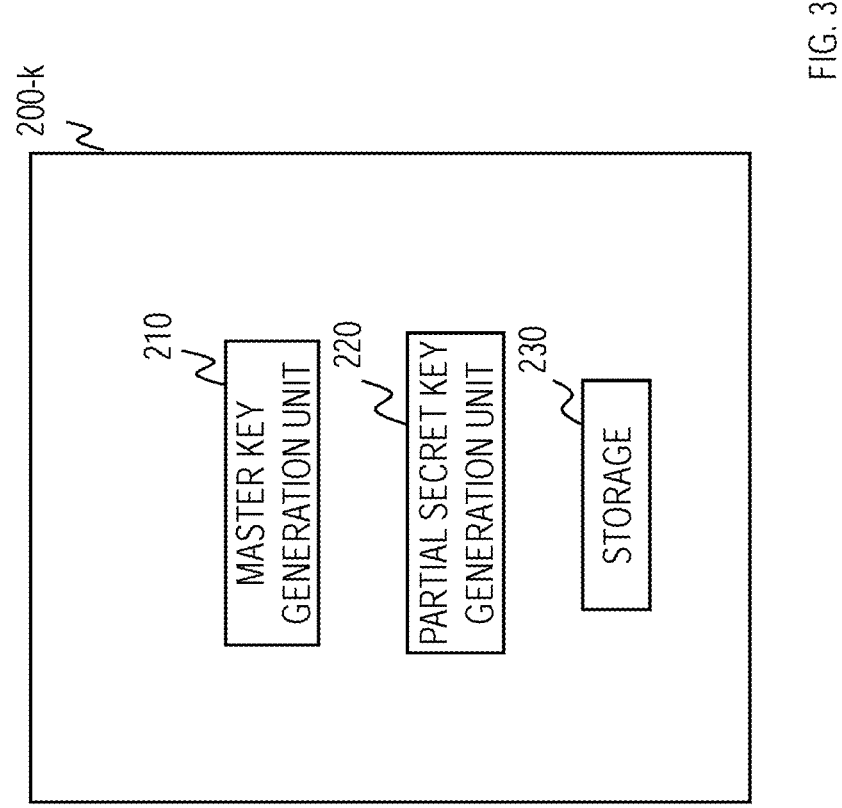
FIG. 3 is a functional block diagram of a key generation device according to the first embodiment.
Figure 4:
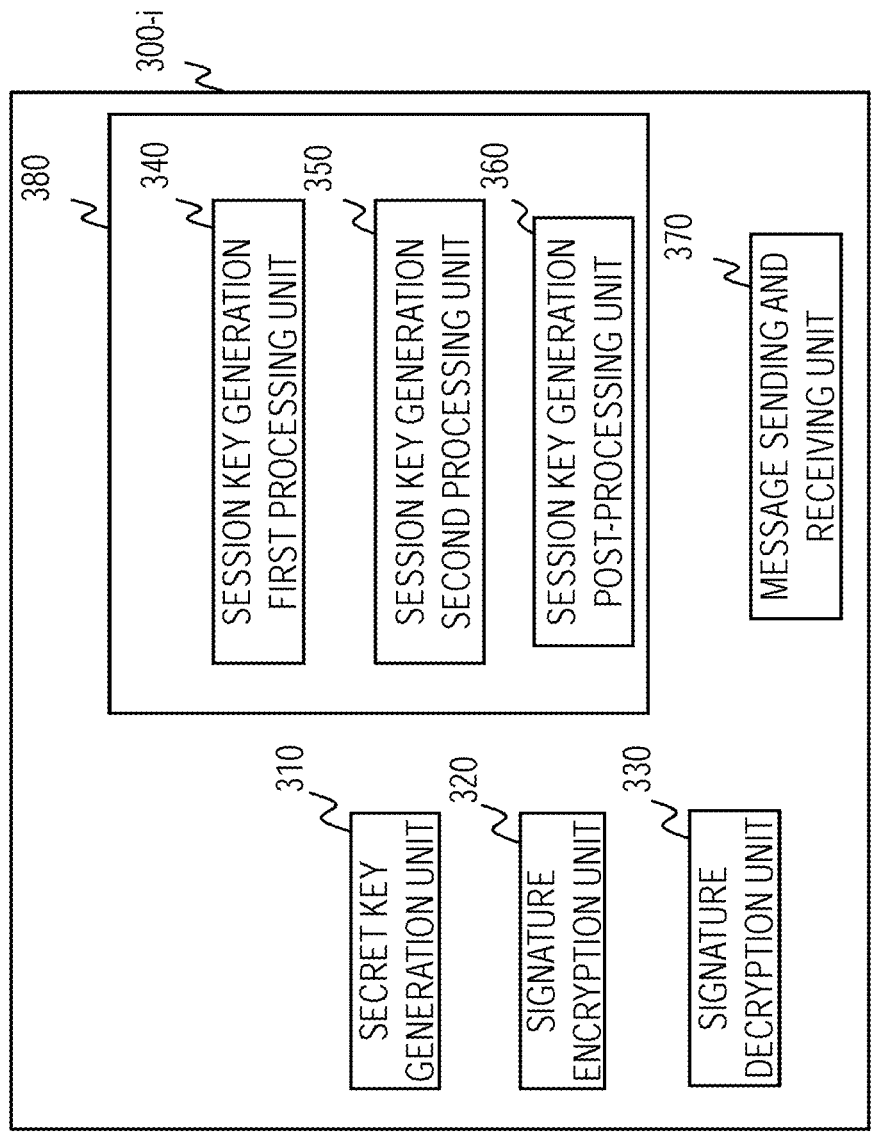
FIG. 4 is a functional block diagram of a communication device according to the first embodiment.
Figure 5:
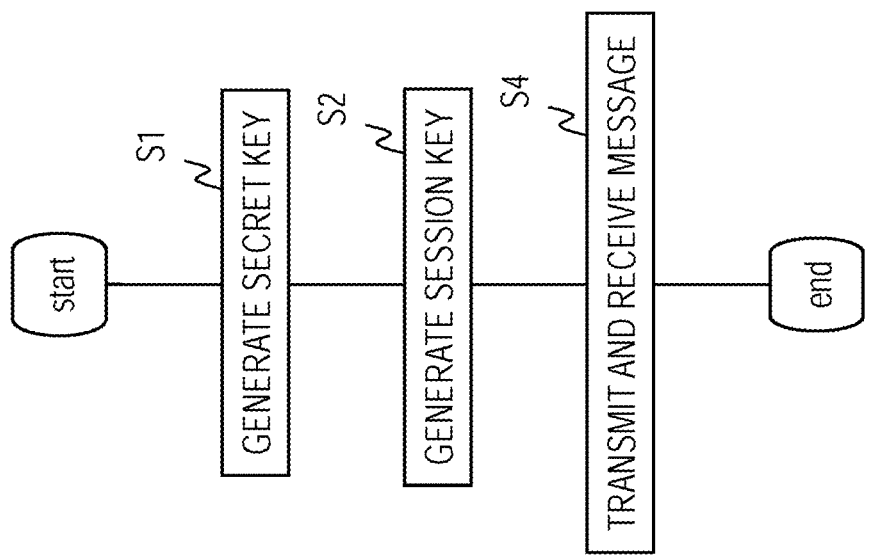
FIG. 5 shows an example of the processing flow of a concealed communication system according to the first embodiment.

FIG. 2 shows a functional block diagram of the server device 100; FIG. 3 shows a functional block diagram of the key generation device 200-$k$; and FIG. 4 shows a functional block diagram of the communication device 300-$i$. FIG. 5 shows an example of the processing flow of the concealed communication system.

The server device 100 includes a session key generation information saving unit 110 and a message saving unit 120.

The key generation device 200-$k$ includes a master key generation unit 210, a partial secret key generation unit 220, and a storage 230.

The communication device 300-$i$ includes a secret key generation unit 310, a signature encryption unit 320, a signature decryption unit 330, a session key generation unit 380, and a message sending and receiving unit 370. The session key generation unit 380 further includes a session key generation first processing unit 340, a session key generation second processing unit 350, and a session key generation post-processing unit 360.

The communication device 300-$i$ communicates with at least in out of the K key generation devices 200-$k$ and generates a secret key (S1).

Next, the communication device 300-$p$ generates a session key which will be used in communication with other communication devices 300-$q$ included in a group to which the communication device 300-$p$ itself belongs via the server device 100 (S2). Using the secret key generated at S1, information to be transmitted and received are encrypted and decrypted.

The communication device 300-$p$ transmits and receives messages to/from other communication devices 300-$q$ included in the group to which the communication device 300-$p$ itself belongs via the server device 100 (S3). The messages are encrypted and decrypted using the session key generated at S2. Further, using the secret key generated at S1, encrypted messages are encrypted and decrypted.

The contents of processing will be described more specifically below.

<S1: Secret Key Generation>

The server device 100 generates or selects system parameters (p, G, g, TCR, tPRF, tPRF', F), stores them in a storage not shown, and discloses them. The term "disclose" means saving something so that it is accessible to the N communication devices 300-$i$ included in the concealed communication system.

The master key generation unit 210 of each of the K key generation devices 200-$k$ generates a master secret key $BMSK_k$ and a master public key $BMPK_k$ using BSC.Setup (($BMSK_k$, $BMPK_k$)←BSC.Setup ($1^\kappa$)), and discloses the master public key $BMPK_k$. The master secret key $BMSK_k$ is stored in the storage 230 and kept secret. The phrase "keeping secret" means saving certain information such that it cannot be accessed by unauthorized users or other devices.

The partial secret key generation unit 220 of each of the K key generation devices 200-$k$ generates a partial secret key $bsk^{(k)}_i$ for each communication device 300-$i$ using BSC.Extract with the master secret key $BMSK_k$ and the identifier $ID_i$ of each communication device 300-$i$ as input ($bsk^{(k)}_i$←BSC.Extract($BMSK_k$, $ID_i$)), and transmits it to each communication device 300-$i$. For example, the partial secret key generation unit 220 receives the identifier $ID_i$ and a partial key generation request from each communication device 300-$i$, and generates the partial secret key $bsk^{(k)}_i$ upon request.

The secret key generation unit 310 of each communication device 300-$i$ obtains the partial secret key $bsk^{(k)}_i$ from each of at least m key generation devices 200-$k$, concatenates the partial secret keys $bsk^{(k)}_i$ using Combine, calculates a secret key $bsk_i$ ($bsk_i$←Combine ($\{bsk^{(k)}_i\}_{k\in[1,m]}$)), and stores it in a storage not shown, keeping it secret. Here, in is any integer greater than 0 and K or less.

Further, the secret key generation unit 310 generates secret character strings $st_i$, $st\tilde{~}_i$ ($st_i \in_{\kappa}\{0, 1\}^\kappa$, $st\tilde{~}_i \in_R salt_\kappa$), stores a static secret key $SSK_i=(bsk_i, st_i, st\tilde{~}_i)$ in a storage not shown, and keeps it secret.

In the subsequent processing, each communication device 300-$i$ transmits and receives information that is encrypted with the secret key $bsk_i$ to/from the server device 100, so the server device 100 is unable to decrypt the information.

<Broadcast>

A way for a communication device 300-$p$ belonging to a certain group to broadcast the message M to other communication devices 300-$q$ belonging to that group is now described.

<<Signature Encryption Processing>>

The signature encryption unit 320 of any communication device 300-$p$ that belongs to the set R among the N communication devices 300-$i$ takes the message M, the secret key $bsk_p$, and the set R as input, generates a cipher text $CT_p$ with BSC ($CT_p$←BSC ($\{BMPK_k\}_{k\in[1,m]}$, $ID_p\|M$, $bsk_p$, R')), and transmits the cipher text $CT_p$ to the server device 100. The secret key $bsk_p$ is fetched from a storage not shown. The set R can be acquired (for example, distributed by a representative communication device of the group) at the time of becoming a member of the group or at the time of changing a communication device belonging to the group, and the communication device 300-$p$ stores it in a storage not shown and fetches it at the time of broadcasting. $\{BMPK_k\}_{k\in[1,m]}$ is acquired by receiving the one disclosed at the master key generation unit 210 of the key generation device 200-$k$ ($k\in[1, m]$), storing it in a storage not shown, and fetching it at the time of broadcasting. The message M is input only once in some manner within a series of exchanges (a single broadcast), and similarly the cipher text $CT_p$ is also generated only once and transmitted. For example, the message M may be information entered by the user of the communication device 300-$p$ or information acquired or generated based on entered information, or may be information collected by the communication device 300-$p$ from a storage not shown or information acquired or generated based on collected information.

The signature encryption unit 320 of any communication device 300-$r$ (r=n+1, n+2, N) that does not belong to the set R among the N communication devices 300-$i$ selects the dummy message c from $G \times \{0, 1\}^{v\_ID}$ and transmits it to the server device 100.

The session key generation information saving unit 110 of the server device 100 receives the message that was encrypted by the communication device 300-$p$ (that is, cipher text $CT_p$), and stores n cipher texts such that they are downloadable by the other communication devices. The session key generation information saving unit 110 also receives the dummy messages ε transmitted by each communication device 300-$r$ not belonging to the set R, and stores N−n dummy messages such that they are downloadable by the other communication devices.

<<Signature Decryption Processing>>

The signature decryption unit 330 of each of n communication devices 300-$p$ belonging to the set R among the N communication devices 300-$i$ downloads n−1 cipher texts $CT_1, \ldots, CT_{p-1}, CT_{p+1}, \ldots, CT_n$ and N−n dummy messages ε from the server device 100. However, the signature decryption unit 330 of the communication device 300-$i$ may also be configured to download n cipher texts ($CT_1, \ldots, CT_n$) and N−n dummy messages ε and discard the cipher text $CT_p$ transmitted by the communication device 300-$p$ itself. Further, the signature decryption unit 330 decrypts the cipher text $CT_q$ with BUSC (($ID_q$, M)←BUSC ($\{BMPK_k\}_{k\in[1,m]}$, $bsk_p$, $CT_q$)). If the result of decrypting the cipher text is ($ID_q$, M), the communication device 300-$p$ regards M as the message transmitted from the communication device 300-$q$. Further, the signature decryption unit 330 of the communication device 300-$p$ discards the N−n dummy messages ε.

The signature decryption unit 330 of each of N−n communication devices 300-$r$ not belonging to the set R among the N communication devices 300-$i$ downloads n cipher texts $CT_1, \ldots, CT_n$ and N−n−1 dummy messages ε from the server device 100. However, the signature decryption unit 330 of the communication device 300-$i$ may also be configured to download n cipher texts ($CT_1, \ldots, CT_n$) and N−n dummy messages ε and discard the dummy message c transmitted by the communication device 300-$p$ itself.

Further, the signature decryption unit 330 discards the downloaded cipher texts ($CT_1, \ldots, CT_n$) and dummy messages ε. Note that the signature decryption unit 330 of a communication device 300-$r$ not belonging to the set R is unable to decrypt the downloaded cipher texts ($CT_1, \ldots, CT_n$).

Broadcast executes the processing in the signature encryption unit 320 and the processing in the signature decryption unit 330 described above at intervals of the predetermined time $T_1$. For example, the above-described processing in the signature encryption unit 320 is executed randomly in a predetermined time T ($<T_1$). When the predetermined time T has elapsed, the processing in the signature decryption unit 330 is executed.

<S2: Session Key Generation>

The session key generation unit 380 of any communication device 300-$p$ belonging to the set R broadcasts information for use in generation of a session key (hereinafter, also called session key generation information). That is, it encrypts the session key generation information and transmits it to the server device 100.

The session key generation unit 380 of any communication device 300-$r$ not belonging to the set R broadcasts a dummy message. That is, it transmits a dummy message to the server device 100.

When the predetermined time T has elapsed, the session key generation unit 380 of the communication device 300-$p$ belonging to the set R downloads encrypted n−1 pieces of session key generation information and N−n dummy messages ε from the server device 100, decrypts the encrypted n−1 pieces of session key generation information using the secret key $bsk_p$, and generates a session key using the decrypted n−1 pieces of session key generation information and the session key generation information generated by itself.

When the predetermined time T has elapsed, the session key generation unit 380 of the communication device 300-$r$ not belonging to the set R downloads encrypted n pieces of session key generation information and N−n−1 dummy messages E from the server device 100 and discards them.

A specific example of the processing performed by the session key generation unit 380 is now described.

<<Session Key Generation First Processing>>

The session key generation first processing unit 340 of any communication device 300-$p$ belonging to the set R among the N communication devices 300-$i$ generates $x_p \in_R \{0,1\}^\kappa$, $x^\sim_p \in_R salt_\kappa$, $k_p \in_R \{0,1\}^\kappa$, and $k^\sim_p \in_R salt_\kappa$ as an ephemeral secret key $ESK_p$, and calculates $x'_p = tPRF(st^\sim_p, x_p, st_p, x^\sim_p)$ and $k'_p = tPRF'(st^\sim_p, k_p, st_p, k^\sim_p)$. Further, the session key generation first processing unit 340 calculates $X_p = g^{x'\_p}$ and broadcasts $X_p$. That is, it obtains $CT_p \leftarrow BSC(\{BMPK_k\}_{k \in [1,m]}, ID_p \| X_p, bsk_p, R')$ and transmits the cipher text $CT_p$ to the server device 100. tPRF, tPRF', and g are acquired by receiving the ones disclosed at the server device 100, and $st^\sim_p$ and $st_p$ are acquired by fetching the ones stored as the static secret key $SSK_p = (bsk_p, st_p, st^\sim_p)$ in a storage not shown. Note that, as mentioned previously, $X_p$ is also called the first information and $k'_p$ is also called the second information.

The session key generation first processing unit 340 of any communication device 300-$r$ not belonging to the set R among the N communication devices 300-$i$ generates $x_i \in_R \{0,1\}^\kappa$, $x^\sim_i \in_R salt_\kappa$, $k_i \in_R \{0,1\}^\kappa$, and $k^\sim_i \in_R salt_\kappa$ as the ephemeral secret key $ESK_i$ and broadcasts E. That is, it transmits ε to the server device 100. Here, ε is a dummy message selected from $G \times \{0,1\}^{\nu\_ID}$.

The session key generation information saving unit 110 of the server device 100 receives encrypted n pieces of first information $X_p$ and N−n dummy messages E and stores them in a downloadable manner.

<<Session Key Generation Second Processing>>

The session key generation second processing unit 350 of any communication device 300-$p$ belonging to the set R among the N communication devices 300-$i$ downloads n−1 cipher texts $CT_1, \ldots, CT_{p-1}, CT_{p+1}, \ldots, CT_n$ and N−n dummy messages E from the server device 100. The session key generation second processing unit 350 removes the dummy messages ε, decrypts $\{CT_q\}_{ID\_q \in R \setminus \{ID\_p\}}$ to obtain $\{X_q\}_{ID\_q \in R \setminus \{ID\_p\}}$ $((ID_q, X_q) \leftarrow BUSC(\{BMPK_k\}_{k \in [1,m]}, bsk_p, CT_q))$.

The session key generation second processing unit 350 of any communication device 300-$p$ other than a communication device that serves as a representative (hereinafter, also called a representative communication device) among the n communication devices 300-$p$ belonging to the set R calculates $sid = TCR(CT_1, \ldots, CT_n)$ and $T_p = X^{x'\_p}_{p-1}$ xor $X^{x'\_p}_{p+1}$, and broadcasts $(k'_p, T_p)$. That is, the session key generation second processing unit 350 obtains $CT_p \leftarrow BSC(\{BMPK_k\}_{k \in [1,m]}, ID_p \| (k'_p, T_p), bsk_p, R')$ and transmits the cipher text $CT_p$ to the server device 100. TCR is acquired by receiving the one disclosed at the server device 100.

The session key generation second processing unit 350 of the representative communication device (for example, communication device 300-$l$) among the n communication devices 300-$p$ belonging to the set R calculates $sid = TCR(CT_1, \ldots, CT_n)$ and $T_1 = X^{x'\_1}_n$ xor $X^{x'\_1}_2$ and $T' = X^{x'\_1}_n$ xor $k'_1$, and broadcasts (T', $T_1$). That is, it obtains $CT_1 \leftarrow BSC(\{BMPK_k\}_{k \in [1,m]}, ID_1 \| (k'_1, T_1), bsk_1, R')$ and transmits the cipher text $CT_1$ to the server device 100.

The session key generation second processing unit 350 of any communication device 300-$r$ not belonging to the set R among the N communication devices 300-$i$ downloads all the cipher texts $(CT_1, \ldots, CT_n)$ and N−n−1 dummy messages ε from the server device 100 and discards them. It further broadcasts a new dummy message ε. That is, the session key generation second processing unit 350 transmits ε to the server device 100. Here, ε is a dummy message selected from $G^2 \times \{0,1\}^{\nu\_ID}$.

The session key generation information saving unit 110 of the server device 100 receives n−1 sets of ($k'_p, T_p$), one set of (T', $T_1$), and N−n dummy messages ε and stores them in a downloadable manner. Note that, as mentioned previously, $T_p$ is also called the third information and T' is also called the fourth information. The session key generation information described above is information including the first information, the second information, the third information, and the fourth information, for example.

<<Session Key Generation Post-Processing>>

The session key generation post-processing unit 360 of any communication device 300-$p$ belonging to the set R among the N communication devices 300-$i$ downloads n−1 cipher texts $CT_1, \ldots, CT_{p-1}, CT_{p+1}, \ldots, CT_n$ and N−n dummy messages ε from the server device 100. The session key generation post-processing unit 360 removes ε as dummy messages.

The session key generation post-processing unit 360 of any communication device 300-$p$ other than the representative communication device 300-$l$ among the n communication devices 300-$p$ belonging to the set R decrypts $\{CT_q\}_{ID\_q \in R \setminus \{ID\_p\}}$ and obtains ($k'_q, T_q)_{ID\_q \in R}$ and (T', $T_1$) $((ID_1, (k'_q, T_q)) \leftarrow BUSC(\{BMPK_k\}_{k \in [1,m]}, bsk_p, CT_q)$, $(ID_1, (T', T_1)) \leftarrow BUSC(\{BMPK_k\}_{k \in [1,m]}, bsk_p, CT_1))$. The session key generation post-processing unit 360 calculates $k'_1 = T'$ xor $X^{x'\_p}_{p-1}$ xor $(XOR_{1 \le q \le p-1} T_q)$ and $SK = F(XOR_{1 \le p \le n} k'_p, sid)$ to obtain the session key SK.

The session key generation post-processing unit 360 of the representative communication device 300-$l$ among the n communication devices 300-$p$ belonging to the set R decrypts $\{CT_q\}_{ID\_q \in R \setminus \{ID\_1\}}$ and obtains ($k'_q, T_q)_{ID\_q \in R'}$ $((ID_q, (k'_q, T_q)) \leftarrow BUSC(\{BMPK_k\}_{k \in [1,m]}, bsk_1, CT_q))$. The session key generation post-processing unit 360 calculates $SK = F(XOR_{1 \le i \le n} k'_i, sid)$ to obtain the session key SK.

The session key generation post-processing unit 360 of any communication device 300-$r$ not belonging to the set R among the N communication devices 300-$i$ downloads all the cipher texts $(CT_1, \ldots, CT_n)$ and N−n−1 dummy messages ε from the server device 100 and discards them.

<S4: Message Transmission and Reception>

<<Message Transmission>>

The message sending and receiving unit 370 of any communication device 300-$p$ belonging to the set R encrypts MS with the session key SK using a symmetric key cryptosystem like AES and broadcasts a cipher text C. That is, the message sending and receiving unit 370 obtains $CT_p \leftarrow BSC(\{BMPK_k\}_{k \in [1,m]}, ID_p \| C, bsk_p, R')$ and transmits the cipher text $CT_p$ to the server device 100. As broadcast is performed at the intervals of predetermined time $T_1$, processing may be performed regarding an empty message as the message MS when there is no message MS.

The message sending and receiving unit 370 of any communication device 300-$r$ not belonging to the set R broadcasts a new dummy message ε. That is, the message sending and receiving unit 370 transmits ε to the server device 100 without encrypting it.

The message saving unit 120 of the server device 100 receives encrypted n cipher texts $CT_1, \ldots, CT_{p-1}, CT_{+1}, \ldots, CT_n$ and N−n dummy messages ε and stores them in a downloadable manner.

<<Message Reception>>

The message sending and receiving unit 370 of any communication device 300-$p$ belonging to the set R downloads n−1 cipher texts $CT_1, \ldots, CT_{p-1}, CT_{p+1}, \ldots, CT_n$ and N−n dummy messages ε from the server device 100. The message sending and receiving unit 370 removes ε as dummy messages and decrypts $\{CT_q\}_{ID\_q \in R \setminus \{ID\_p\}}$ to obtain the cipher text C $((C, ID_q) \leftarrow BUSC(\{BMPK_k\}_{k \in [1,m]}, bsk_p, CT_q))$. Further, it decrypts the cipher text C with the session key SK to obtain the message MS.

The message sending and receiving unit 370 of any communication device 300-$r$ not belonging to the set R downloads n cipher texts $CT_1, \ldots, CT_n$ and N−n−1 dummy messages ε from the server device 100, and discards them.

<Effects>

With the configuration described above, no decryption operation is required at the server device, which is a component of the concealed communication network. Moreover, since all the communication devices that receive concealed communication services transmit data to the server device and all the communication devices download data from the server device, the communication devices as the source and destination of data transmission are not identifiable. In other words, metadata concealed communication is realized that reduces operations performed in the concealed communication network to a constant number of times and thus improves the throughput, by concealing metadata using a number of key exchange devices and exchanging a session key among communication devices to ensure anonymity against the concealed communication network beforehand. It also makes the source and destination of transmission unidentifiable by always producing communication between all the communication devices and the concealed communication network. For example, a network like The Onion Router (Tor) can be provided to a global enterprise or a company that utilizes satellite communications, and confidentiality in communication, including metadata, can be ensured.

<Other Modifications>

The present invention is not limited to the above embodiment and modification. For example, the above-described various kinds of processing may be executed, in addition to being executed in chronological order in accordance with the descriptions, in parallel or individually depending on the processing power of a device that executes the processing or when necessary. In addition, changes may be made as appropriate without departing from the spirit of the present invention.

<Program and Recording Medium>

Further, various types of processing functions in the devices described in the above embodiment and modification may be implemented on a computer. In that case, the contents of processing function to be contained in each device are written by a program With this program executed on the computer, various types of processing functions in the above-described devices are implemented on the computer.

This program in which the contents of processing are written can be recorded in a computer-readable recording medium. The computer-readable recording medium may be any medium such as a magnetic recording device, an optical disk, a magneto-optical recording medium, and a semiconductor memory.

Distribution of this program is implemented by sales, transfer, rental, and other transactions of a portable recording medium such as a DVD and a CD-ROM on which the program is recorded, for example. Furthermore, this program may be distributed by storing the program in a storage unit of a server computer and transferring the program from the server computer to other computers via a network.

A computer which executes such program first stores the program recorded in a portable recording medium or transferred from a server computer once in a storage thereof, for example. When the processing is performed, the computer reads out the program stored in the storage thereof and performs processing in accordance with the program thus read out. As another execution form of this program, the computer may directly read out the program from a portable recording medium and perform processing in accordance with the program. Furthermore, each time the program is transferred to the computer from the server computer, the computer may sequentially perform processing in accordance with the received program. Alternatively, a configuration may be adopted in which the transfer of a program to the computer from the server computer is not performed and the above-described processing is executed by so-called application service provider (ASP)-type service by which the processing functions are implemented only by an instruction for execution thereof and result acquisition. It should be noted that the program includes information which is provided for processing performed by electronic calculation equipment and which is equivalent to a program (such as data which is not a direct instruction to the computer but has a property specifying the processing performed by the computer).

Moreover, the devices are assumed to be configured with a predetermined program executed on a computer. However, at least part of these processing contents may be realized in a hardware manner.

What is claimed is:

1. A communication device that performs communication with other communication devices while keeping anonymity via a concealed communication network including a server device, the communication device comprising:
   processing circuitry configured to implement
   a secret key generation unit that generates a secret key using m partial secret keys included in K partial secret keys generated by K key generation devices, respectively;
   a signature encryption unit in which given that N communication devices including the communication device itself utilize concealed communication provided by the concealed communication network and that n communication devices out of the N communication devices belong to a group, (1-1) if the communication device itself belongs to the group, the signature encryption unit encrypts input information with the secret key and transmits the information to the server device, and (1-2) if the communication device itself does not belong to the group, the signature encryption unit transmits a dummy message to the server device;

a signature decryption unit in which (2-1) if the communication device itself belongs to the group, the signature decryption unit downloads, from the server device, encrypted n−1 pieces of the input information and N−n number of the dummy messages transmitted from the other communication devices and decrypts the encrypted n−1 pieces of the input information with the secret key, and (2-2) if the communication device itself does not belong to the group, the signature decryption unit downloads encrypted n pieces of the input information and N−n−1 number of the dummy messages transmitted from the other communication devices;

a session key generation unit that transmits session key generation information to the server device via the signature encryption unit, the session key generation information being information for use in generation of a session key, and generates the session key using n−1 pieces of session key generation information acquired via the signature decryption unit and session key generation information of the communication device itself; and a message sending and receiving unit that transmits a cipher text encrypted with the session key via the signature encryption unit to the server device and decrypts n−1 cipher texts acquired via the signature decryption unit with the session key.

2. A server device as a component of a concealed communication network that provides concealed communication to N communication devices, wherein n communication devices out of the N communication devices belong to a group, and each of the communication devices includes processing circuitry configured to implement a secret key generation unit that generates a secret key using m partial secret keys included in K partial secret keys generated by K key generation devices, respectively, a signature encryption unit in which (1-1) if the communication device itself belongs to the group, the signature encryption unit encrypts input information with the secret key and transmits the information to the server device, and (1-2) if the communication device itself does not belong to the group, the signature encryption unit transmits a dummy message to the server device, a signature decryption unit in which (2-1) if the communication device itself belongs to the group, the signature decryption unit downloads, from the server device, encrypted n−1 pieces of the input information and N−n number of the dummy messages transmitted from the other communication devices and decrypts the encrypted n−1 pieces of the input information with the secret key, and (2-2) if the communication device itself does not belong to the group, the signature decryption unit downloads encrypted n pieces of the input information and N−n−1 number of the dummy messages transmitted from the other communication devices, a session key generation unit that transmits session key generation information to the server device via the signature encryption unit, the session key generation information being information for use in generation of a session key, and generates the session key using n−1 pieces of session key generation information acquired via the signature decryption unit and session key generation information of the communication device itself, and a message sending and receiving unit that transmits a cipher text encrypted with the session key via the signature encryption unit to the server device and decrypts n−1 cipher texts acquired via the signature decryption unit with the session key, the server device comprising:

processing circuitry configured to implement a session key generation information saving unit that receives encrypted n pieces of the session key generation information and N−n number of the dummy messages and stores them in a downloadable manner; and a message saving unit that receives encrypted n number of the cipher texts and N−n number of the dummy messages and stores them in a downloadable manner.

3. A concealed communication system comprising:

a server device;

K key generation devices; and

N communication devices, wherein n communication devices out of the N communication devices belong to a group, each of the communication devices includes processing circuitry configured to implement a secret key generation unit that generates a secret key using m partial secret keys included in K partial secret keys generated by the K key generation devices, respectively, a signature encryption unit in which (1-1) if the communication device itself belongs to the group, the signature encryption unit encrypts input information with the secret key and transmits the information to the server device, and (1-2) if the communication device itself does not belong to the group, the signature encryption unit transmits a dummy message to the server device, a signature decryption unit in which (2-1) if the communication device itself belongs to the group, the signature decryption unit downloads, from the server device, encrypted n−1 pieces of the input information and N−n number of the dummy messages transmitted from the other communication devices and decrypts the encrypted n−1 pieces of the input information with the secret key, and (2-2) if the communication device itself does not belong to the group, the signature decryption unit downloads encrypted n pieces of the input information and N−n−1 number of the dummy messages transmitted from the other communication devices, a session key generation unit that transmits session key generation information to the server device via the signature encryption unit, the session key generation information being information for use in generation of a session key, and generates the session key using n−1 pieces of session key generation information acquired via the signature decryption unit and session key generation information of the communication device itself, and a message sending and receiving unit that transmits a cipher text encrypted with the session key via the signature encryption unit to the server device and decrypts n−1 cipher texts acquired via the signature decryption unit with the session key, and the server device includes processing circuitry configured to implement a session key generation information saving unit that receives encrypted n pieces of the session key generation information and N−n number of the dummy messages and stores them in a downloadable manner, and a message saving unit that receives encrypted n number of the cipher texts and N−n number of the dummy messages and stores them in a downloadable manner.

4. The concealed communication system according to claim 3, wherein the processing circuitry of each of the communication devices further implements the session key generation unit to include a session key generation first processing unit in which (i-1) if the communication device itself belongs to the group, the session key generation first processing unit generates an ephemeral secret key, generates first information $X_p$ and second information $k'_p$ using the ephemeral secret key, and transmits the first information $X_p$ to the server device via the signature encryption unit, and (i-2) if the communication device itself does not belong to the group, the session key generation first processing unit transmits a dummy message to the server device, a session key generation second processing unit in which (ii-1) if the communication device itself is a communication device other than a representative communication device belonging to the group, the session key generation second processing unit acquires n−1 pieces of first information $X_q$ via the signature decryption unit, generates third information $T_p$ from at least two pieces of the first information out of the n−1 pieces of the first information $X_q$, and transmits the second information $k'_p$ and the third information $T_p$ to the server device via the signature encryption unit, and (ii-2) if the communication device itself is a representative communication device belonging to the group, the session key generation second processing unit acquires n−1 pieces of the first information $X_q$ via the signature decryption unit, generates third information $T_p$ from at least two pieces of the first information out of the n−1 pieces of the first information $X_q$, generates fourth information T' from at least one piece of the first information out of the n−1 pieces of the first information $X_q$ and from the second information $k'_p$ of the representative communication device, and transmits the third information $T_p$ and the fourth information T' to the server device via the signature encryption unit, and (ii-3) if the communication device itself does not belong to the group, the session key generation second processing unit acquires n pieces of the first information via the signature encryption unit and transmits a dummy message to the server device, and a session key generation post-processing unit in which (iii-1) if the communication device itself is a communication device other than a representative communication device belonging to the group, the session key generation post-processing unit acquires n−1 pieces of third information $T_q$, n−2 pieces of second information $k'_q$, and the fourth information T' via the signature decryption unit, obtains the second information $k'_q$ of the representative communication device from at least one piece of the first information out of n−1 pieces of the first information $X_q$ and from the fourth information T', and generates a session key from n pieces of the second information $k'_p$, and (iii-2) if the communication device itself is a representative communication device belonging to the group, the session key generation post-processing unit acquires n−1 pieces of the third information $T_q$ and n−1 pieces of the second information $k'_q$ via the signature decryption unit and generates a session key from the n pieces of the second information $k'_p$, and the session key generation information includes the first information, the second information, the third information, and the fourth information.

5. A concealed communication method using a communication device that performs communication with other communication devices via a concealed communication network including a server device, comprising:

a secret key generation step of generating a secret key using m partial secret keys included in K partial secret keys generated by K key generation devices, respectively;

a signature encryption step in which given that N communication devices including the communication device itself utilize concealed communication provided by the concealed communication network and that n communication devices out of the N communication devices belong to a group, (1-1) if the communication device itself belongs to the group, the signature encryption step includes encrypting input information with the secret key and transmitting the information to the server device, and (1-2) if the communication device itself does not belong to the group, the signature encryption step includes transmitting a dummy message to the server device;

a signature decryption step in which (2-1) if the communication device itself belongs to the group, the signature decryption step includes downloading, from the server device, encrypted n−1 pieces of the input information and N−n number of the dummy messages transmitted from the other communication devices and decrypting the encrypted n−1 pieces of the input information with the secret key, and (2-2) if the communication device itself does not belong to the group, the signature decryption step includes downloading encrypted n pieces of the input information and N−n−1 number of the dummy messages transmitted from the other communication devices;

a session key generation step of transmitting session key generation information to the server device via the signature encryption step, the session key generation information being information for use in generation of a session key, and generating the session key using n−1 pieces of session key generation information acquired via the signature decryption step and session key generation information of the communication device itself; and a message sending and receiving step of transmitting a cipher text encrypted with the session key via the signature encryption step to the server device and decrypting n−1 cipher texts acquired via the signature decryption step with the session key.

6. A concealed communication method using a server device as a component of a concealed communication network that provides concealed communication to N communication devices, wherein n communication devices out of the N communication devices belong to a group, each of the communication devices includes a secret key generation unit that generates a secret key using m partial secret keys included in K partial secret keys generated by K key generation devices, respectively, a signature encryption unit in which (1-1) if the communication device itself belongs to the group, the signature encryption unit encrypts input information with the secret key and transmits the information to the server device, and (1-2) if the communication device itself does not belong to the group, the signature encryption unit transmits a dummy message to the server device, a signature decryption unit in which (2-1) if the communication device itself belongs to the group, the signature decryption unit downloads, from the server device, encrypted n−1 pieces of the input information and N−n number of the dummy messages transmitted from the other communication devices and decrypts the encrypted n−1 pieces of the input information with the secret key, and (2-2) if the communication device itself does not belong to the group, the signature decryption unit downloads encrypted n pieces of the input information and N−n−1 number of the dummy messages transmitted from the other communication devices, a session key generation unit that transmits session key generation information to the server device via the signature encryption unit, the session key generation information being information for use in generation of a session key, and generates the session key using n−1 pieces of session key generation information acquired via the signature decryption unit and session key generation information of the communication device itself, and a message sending and receiving unit that transmits a cipher text encrypted with the session key via the signature encryption unit to the server device and decrypts n−1 cipher texts acquired via the signature decryption unit with the session key, and concealed communication method comprising:
- a session key generation information saving step of receiving encrypted n pieces of the session key generation information and N−n number of the dummy messages and storing them in a downloadable manner, and
- a message saving step of receiving encrypted n number of the cipher texts and N−n number of the dummy messages and storing them in a downloadable manner.

7. A concealed communication method using a server device, K key generation devices, and N communication devices, wherein n communication devices out of the N communication devices belong to a group, the concealed communication method comprising:
- a secret key generation step in which each of the communication devices generates a secret key using m partial secret keys included in K partial secret keys generated by the K key generation devices, respectively;
- a signature encryption step in which (1-1) if the communication device itself belongs to the group, the communication device encrypts input information with the secret key and transmits the information to the server device, and (1-2) if the communication device itself does not belong to the group, the communication device transmits a dummy message to the server device;
- a signature decryption step in which (2-1) if the communication device itself belongs to the group, the communication device downloads, from the server device, encrypted n−1 pieces of the input information and N−n number of the dummy messages transmitted from the other communication devices and decrypts the encrypted n−1 pieces of the input information with the secret key, and (2-2) if the communication device itself does not belong to the group, the communication device downloads encrypted n pieces of the input information and N−n−1 number of the dummy messages transmitted from the other communication devices;
- a step in which the communication device transmits session key generation information to the server device via the signature encryption step, the session key generation information being information for use in generation of a session key;
- a session key generation information saving step in which the server device receives encrypted n pieces of the session key generation information and N−n number of the dummy messages and stores them in a downloadable manner;
- a session key generation step in which the communication device generates the session key using n−1 pieces of session key generation information acquired via the signature decryption step and session key generation information of the communication device itself;
- a step in which the communication device transmits a cipher text encrypted with the session key via the signature encryption step to the server device;
- a message saving step in which the server device receives encrypted n number of the cipher texts and N−n number of the dummy messages and stores them in a downloadable manner; and
- a message sending and receiving step in which the communication device decrypts n−1 cipher texts acquired via the signature decryption step with the session key.

8. A non-transitory computer-readable medium that stores a program for causing a computer to function as the communication device according to claim 1.

9. A non-transitory computer-readable medium that stores a program for causing a computer to function as the server device according to claim 2.

* * * * *